Figure 1:
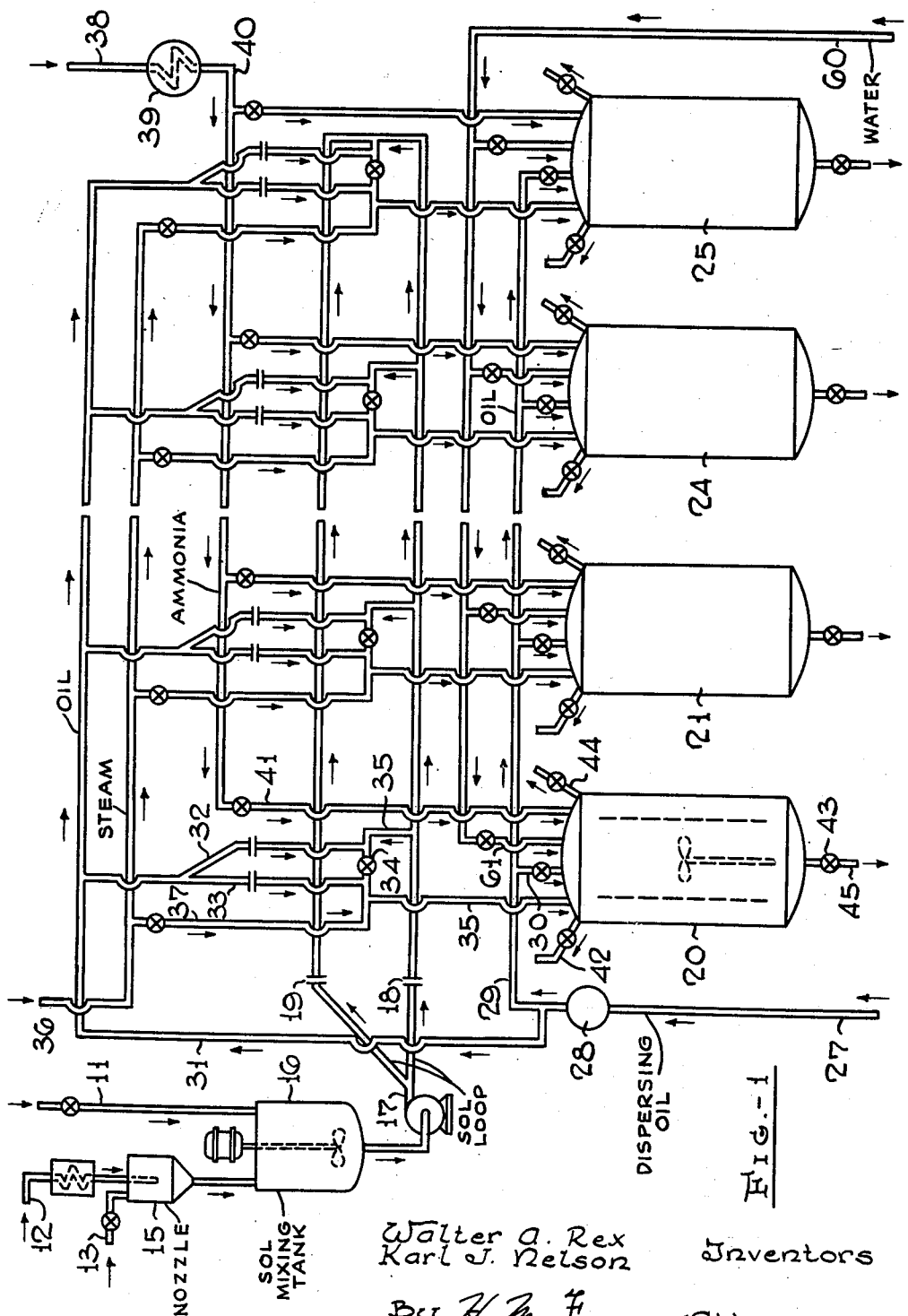

March 31, 1953 W. A. REX ET AL 2,633,454
APPARATUS FOR MANUFACTURE OF MICROSPHEROIDAL GEL BEADS
Original Filed Dec. 29, 1948 2 SHEETS—SHEET 2

Walter A. Rex
Karl J. Nelson Inventors
By H. N. Feyrer Attorney

Patented Mar. 31, 1953

2,633,454

UNITED STATES PATENT OFFICE 2,633,454

APPARATUS FOR MANUFACTURE OF MICROSPHEROIDAL GEL BEADS

Walter A. Rex, Westfield, and Karl J. Nelson, Cranford, N. J., assignors to Standard Oil Development Company, a corporation of Delaware Original application December 29, 1948, Serial No. 68,028. Divided and this application August 1, 1950, Serial No. 176,978

6 Claims. (Cl. 252—359)

The present invention relates to an improved process and apparatus for the production of finely divided microspheroidal gel particles which may be employed advantageously for catalytic cracking, adsorption and other purposes.

It has been proposed to produce inorganic gels as fine, microspherical or microspheroidal particles by dispersing fine droplets of the desired sol in an immiscible setting medium and maintaining the sol droplets in dispersed condition in that medium until they have set to firm gel particles. The resultant gel particles are smooth spheres or spheroids which are especially advantageous in numerous processes, particularly those involving the fluidized solids technique since the smooth rounded particles reduce erosion of the equipment to a minimum and minimize losses of catalyst or contact particles due to attrition. Moreover, the necessity of grinding the gel in order to obtain the desired particle size distribution in the catalyst or contact particle mass is avoided since the size of spheroids is readily controlled in the manufacturing process.

One particular method of preparing spherical or spheroidal gel particles is the emulsion technique wherein a hydrosol of the desired gel is emulsified as the disperse phase in a water-immiscible liquid, agitating the emulsion to prevent agglomeration or coalescence of the hydrosol particles until they have set to a gel and then separating the gel particles from the water-immiscible liquid. The size of the gel particles may be controlled with a considerable degree of accuracy by varying the degree of agitation of the emulsion and the concentration of emulsifying agent employed. The particles formed are remarkably uniform in size and are spherical or spheroidal in form.

In order to prepare spherical or spheroidal gel particles in commercial quantities, it is practically necessary to produce them continuously. A truly continuous system for setting and ammoniating the hydrogel microspheres would involve adding the sol to several agitated reactors in series and withdrawing the set, ammoniated gel from the last vessel. Such a system has been found to be unsatisfactory for microspherical catalyst preparation, at least for the type of agitators, dispersion oils, emulsifying agents and hydrosol concentrations presently contemplated because of plugging of equipment, poor sphere formation and the difficulties in control.

It is the object of this invention to devise a method and apparatus which will permit the production of these spherical or spheroidal gel particles continuously and in large quantities.

It is also the object of this invention to prepare silica-alumina cracking catalysts of high activity and stability in spherical or spheroidal form continuously and in large quantities.

These and other objects will appear more clearly from the following specification and claims.

In accordance with the present invention, overall continuous performance of the system is achieved by utilizing several batch reactors operated on a fixed time cycle. Fully automatic operation of the system can be achieved by providing a time which makes and breaks electrical contacts which control motor driven or air actuated valves used throughout the reactor piping. Because of the setting characteristics of the hydrosol employed in the process, it is highly important that stagnant spots be avoided in all transfer lines carrying this material. The sol must be continuously mixed, impregnated and pumped to the reactors. When shifting flow of sol from one reactor to another, dead spots are avoided in the lines in accordance with the present invention by the use of a pipe loop arrangement containing an orifice near the inlet to each side of the loop across which a substantial pressure drop is taken whereby the flow is distributed evenly between the two lines so that a positive flow will always be maintained in each line no matter which vessel is being charged with hydrosol. In order to decrease the set time of the hydrosol, it is desirable to heat the sol. This is accomplished in accordance with the present invention by injecting steam directly into the hydrosol immediately before charging it into the reactors thereby avoiding the use of indirect heat exchangers which would be rapidly fouled by setting of sol to gel on its surfaces. Direct steam injection also avoids a substantial temperature gradient in the reactor which would be encountered if the oil was heated sufficiently to give the desired final temperature of the emulsion. Separation of the dispersed gel particles from the oil or disepersing liquid may be readily effected by means of heated water, part or all of which can be used to flush out the reactor after setting and ammoniation of the gel have been completed. The present invention further provides for clarification of the dispersing oil in order to maintain the system in balance.

The invention will be further described by reference to the accompanying drawing which is a schematic flowplan for the reactor system.

In the drawing, Fig. 1, II is a supply line for aluminum salt solution, preferably aluminum sulfate solution, 12 is a supply line for sodium silicate solution and 13 is a supply line for sulfuric or other mineral acid which is used for forming silica hydrosol by reaction with sodium silicate solution. The sodium silicate solution supplied through line 12 is passed through heat exchanger 14 in order to adjust its temperature to the desired point for admixture with the acid to form the silica hydrosol. The sodium silicate and the acid solution are continuously and intimately mixed together in a suitable mixing nozzle 15 in such proportions as to form a silica hydrosol of the desired composition and of definite set time. The set time must be long enough so that setting will not occur prior to charging to the reactor but short enough to give a practical setting time after heating and charging it into the reactor. For example, if the charging time of the reactor in the cycle of operations is fifteen minutes, the sol should have a set time of at last eighteen to twenty minutes. If the set time of the sol is less than the charging time for the reactor, there is a tendency for sol introduced in the last stages of the charging operation to deposit upon the sol particles first charged to the reactor which had at least partially set to gel.

The hydrosol is discharged from the mixing nozzle 15 into a mixing tank 16 which is provided with suitable agitating means. Aluminum salt solution is continuously supplied to mixing tank 16 from supply tank 11 and is thoroughly mixed with the silica hydrosol. The aluminum salt impregnated hydrosol is passed through line 17 into a loop arrangement which will be described below in greater detail and thence into a suitable reactor.

In accordance with the present invention, overall continuous performance is achieved by utilizing a plurality of batch reactors which are operated on a fixed timing cycle. In this system, it is preferred to provide a total of five operating reactors and one spare reactor. In the attached drawing, two reactors are omitted from the line to simplify the drawing. The reactors shown are numbered 20, 21, 24 and 25 in the drawing.

The reactor comprises a large casing provided with a centrally disposed draft tube and a motor driven agitator mounted either in the upper or lower end of the casing. It is desirable to provide each reactor with suitable spray nozzle means for washing down the interior of the reactor at the end of each cycle. These spray nozzles may be conveniently arranged upon two annular manifolds and so arranged as to direct sprays of water against the top of the casing as well as against the inner wall of the casing and both walls of the draft tube. Since these reactors are operated batchwise and are, therefore, only partially filled with dispersing oil when the introduction of sol is started, it is desirable to cut several slots in the upper part of the draft tube in order to permit circulation to take place before the reactor is filled to the top of the draft tube.

A storage vessel 26 (Figure 2) is provided for the dispersion medium which can be a water-immiscible material such as an acid treated lube oil stock or the like or a partially water-miscible medium such as butanol or the like. The dispersion oil is supplied through line 27, heat exchanger 28 to line 29 from which there is a valve controlled feeder line 30 into each of the reactors. In order to simplify the drawing, the various feed and inlet lines to only one reactor, reactor 20 will be numbered, but it will be understood that each of the reactors is provided with the same piping and valve arrangements. A bleed oil line 31 is taken off the dispersion medium line 27 for supplying small quantities of oil through lines 32 and 33 to both sides of the control valve 34 in the sol feed inlet line 35 in order to prevent the sol from setting up in the inlet line during the periods when sol is not flowing through the inlet line 35. It will be understood that the sol inlet line will be so positioned as to provide ready drainage into the reactors and thereby prevent or minimize any tendency for the sol to accumulate in the feed inlet lines.

The main sol inlet line 17 as indicated above is arranged in the form of a loop above the group of reactors. As shown in the drawing, the sol inlet line 17 branches in the form of a Y to form the loop. Flow restriction orifices 18 and 19 are arranged at the inlet ends of the loop. By providing a pressure drop in each of the orifices 18 and 19 of about 15–20 lbs./sq. in., which is substantially greater than the pressure drop that occurs during flow through the loop, it is possible to insure substantially equal flows through both sides of the loop to each of the reactors. In this way, it is possible to maintain a continuous flow of sol through the entire sol inlet line, regardless of which reactor is being charged with sol. If this special flow controlled loop were not used but a single sol inlet line were provided, sol would flow through the entire line only when the furthermost reactor 25 is being charged. Since the sol normally has a setting time of from about 15 minutes up to about 60 minutes, it would be necessary to provide some means for purging the inlet line of sol to prevent the setting of sol to gel in those sections of the inlet line where flow is not occurring. This would require additional facilities as well as incur raw material losses.

In order to increase the rate and shorten the time of setting of hydrosol to hydrogel, it is necessary to heat the sol. It has been previously proposed to heat the hydrosol either by indirect heat exchange in a conventional exchanger or by heating the oil to such an extent that the sol is heated to the desired temperature in the reactor by contact with the oil. The first of these methods is objectionable because of the tendency of the sol to set in the exchanger tubes or in transfer lines following the exchanger because of its relatively short set time at the higher temperature. The second method is unsatisfactory because of the temperature gradient obtained during the introduction of the sol to the reactor. The sphere forming and particle size control characteristics of both the sol and the oil phase vary appreciably with even small changes in temperature, thus the temperature gradient greatly reduces control over particle size and shape. In accordance with the present invention, the hydrosol is heated to the desired reactor temperature by injecting steam into the sol inlet line 35 a short distance above the reactor. 36 is the main steam line and 37 is a valve controlled feeder line for supplying steam to the transfer line 35. This steam sparging technique effectively overcomes the objections to the other methods of heating in that the sol prior to admission into the dispersion oil is at the high reactor temperature only in the relatively short length of pipe leading from the injection point into the reactor and temperature gradients during the sol addition are also avoided. Compensation is made for the dilution effect of the steam condensate by adjusting the acid and/or sodium silicate concentrations and volumes used in forming the hydrosol in mixing nozzle 15.

When the hydrosol in reactor 20 has set to hydrogel spheres, it is necessary to precipitate hydrous alumina from the aluminum salt by the addition of a suitable alkali, preferably ammonia. Liquid anhydrous ammonia is withdrawn from storage tank (not shown) through line 38, vaporized in heat exchanger 39 and passed through main line 40 and valve controlled feeder line 41 into reactor 20. Upon completion of the ammoniation step, it is necessary or at least desirable to vent off each reactor before discharging the dispersion of gel particles from the reactor. Accordingly, a valved ammonia vent line 42 is provided on each of the reactors. The vent lines may discharge directly to the atmosphere or, in the event that the quantity of ammonia vented would constitute a nuisance, the vent line 42 may discharge separately or the several vent lines may be manifolded and discharged through a water scrubber (not shown).

Figure 2:
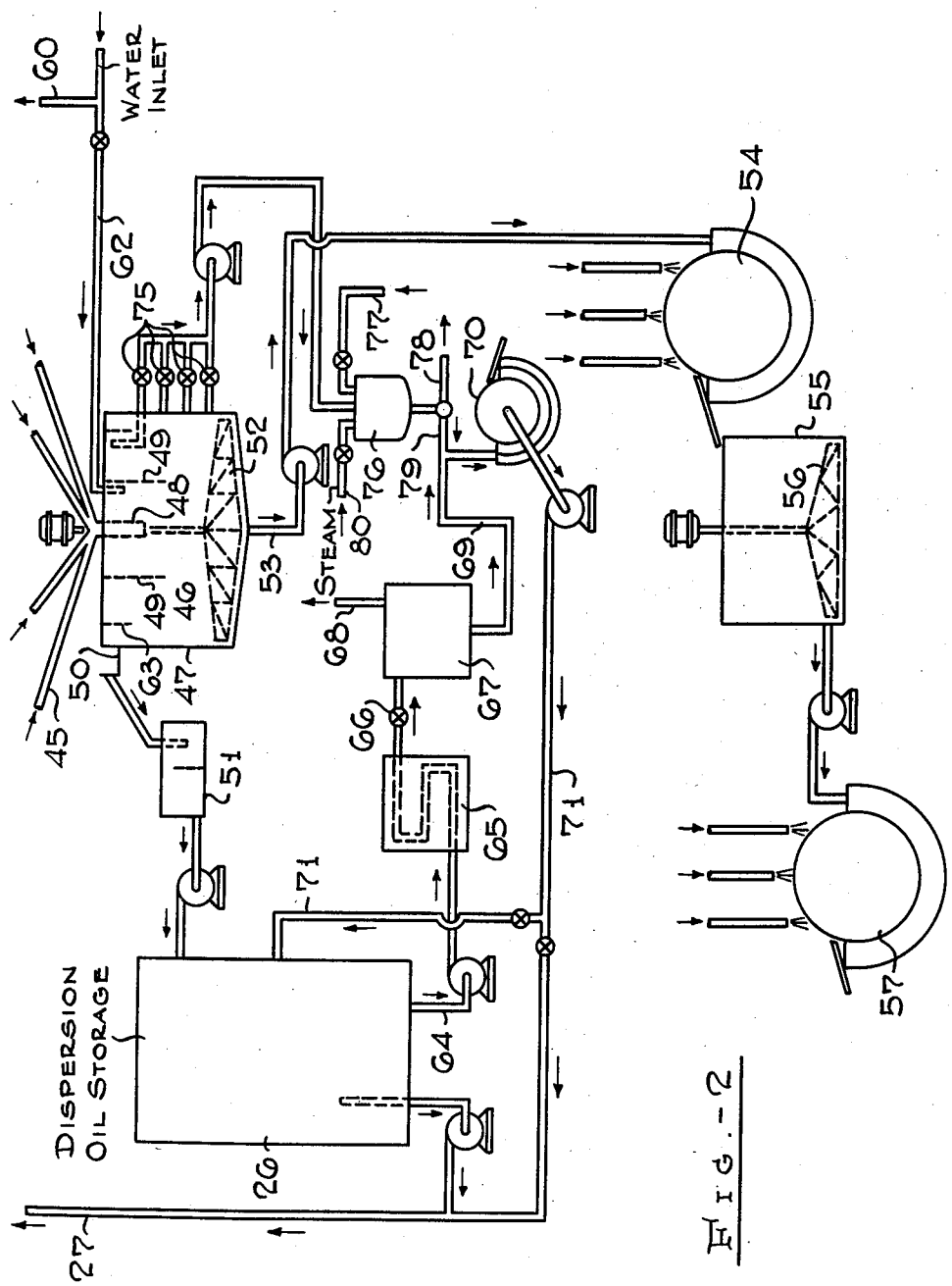

After ammoniation and venting of ammonia, the reactor is discharged by opening flush valve 43 at the bottom and air vent valve 44 at the top of the reactor permitting the oil-gel slurry to discharge through line 45 into the oil-water separator 46 (Figure 2). Provisions are needed for flushing the reactors after each batch to prevent setting and build up of gel on the reactor surfaces. The flushing is accomplished immediately after discharging the oil-gel mixture from the reactor by introducing water, preferably heated to about 200° F. into the reactor through water main 60 and inlet line 61 to the manifold and spray nozzles arranged as described above to permit thorough flushing of the interior surfaces of the reactor. During the period when water is not being admitted to the reactors for flushing, the water is diverted to the oil-water separator 46 through valved line 62 in order to adjust the concentration of the gel slurry to an operable range for pumping. Since the water utilized in flushing the reactor is discharged through lines 45 and 48 into the oil-water separator it may be seen that this water is also effectively utilized in the operation of the oil-water separator. The oil-water separator 46 is essentially a Dorr thickener and comprises a large tank 47 of sufficient capacity to receive the contents of several reactors plus water for slurrying the gel particles, a centrally disposed inlet pipe 48 and an annular baffle 49 for preventing the short circuiting of oil-gel slurry to the oil overflow 50. The oil separated from the water slurry of gel particles passes over the overflow 50 into the surge tank 51 and thence back into the oil storage tank 26. A baffle 63 is preferably provided in order to prevent the froth or scum which accumulates at the top of the separator from passing over the overflow with the oil. A rotatable arm 52 is arranged in the separator 46 in order to prevent the gel particles from accumulating or agglomerating at the bottom of the tank 47 as well as to assist in disengaging entrained oil droplets.

The slurry of gel particles in water is removed from separator 46 through line 53, filtered, and water washed on the filter 54 to a sulfate content below about 2.5% and less than 0.3% $Na_2O$. The washed gel particles are reslurried in water and aged in tank 55 which is provided with a suitable motor driven agitator 56. The aged slurry is refiltered and washed on filter 57 whereupon the gel particles are dried in suitable rotary drying equipment (not shown).

Finely divided suspensions of solids and water of a colloidal nature tend to accumulate in the dispersion oil which adversely affect the sphere forming properties of the dispersion medium. It is necessary therefore to provide means for clarifying the oil. This can be accomplished by substantially continuously withdrawing a stream of oil from the storage tank 26 equal to about 0.5 to 5.0% of the circulating stream, passing it through line 64 to heater 65 where it is heated under mildly superatmospheric pressure such as about 10 lbs./sq. in. to about 215° F. to 235° F. The heated oil is then discharged through a pressure reducing valve 66 into flash drum 67 wherein the water is flashed off at essentially atmospheric pressure, the water vapor leaving the flash drum at 68, the dried oil then being passed through line 69 to a suitable filtering or other separating means 70 for removal of solid materials contained in the oil. Heating and flashing in this manner avoids foaming in the treatment of the oil and serves to eliminate all of the entrained water and substantially improves the filtration rate of the oil. The clarified oil is then recycled to the oil storage tank 26 through line 71.

Undesirable secondary emulsion of water, aluminum floc and hydrogel in oil is formed in separator 46 and must be removed and treated to recover its oil content. An oil-in-water type of emulsion is formed and accumulates near the water-oil interface while a water-in-oil type of emulsion is also formed and accumulates on top of the oil layer. Several outlet lines 75 are provided for withdrawing these emulsions from separator 46. Periodically these emulsions are withdrawn from separator 46 through outlet lines 75 and pumped to the treating and storage vessel 76. The emulsions are treated in batches in vessel 76 by introducing heated water or steam through line 77 and agitating for several hours. The water layer containing essentially all of the solids from the emulsions is withdrawn through line 78 and discarded. The oil is pumped intermittently to filter 70 through line 79 and the filtered oil is returned to the dispersion oil storage vessel 26 along with the main body of clarified oil.

The present invention is particularly adapted for the production of silica-alumina composite gel catalyst particles in spherical or spheroidal form. It will be understood, however, that it is broadly capable of use in the production of inorganic oxide gel particles in general such as silica gel, alumina gel as well as composite gels such as silica-magnesia and silica-alumina-magnesia gels.

The dispersion media can be a hydrocarbon oil such as an acid treated lubricating oil stock, kerosene or the like, or it can be a partially water-miscible organic liquid such as normal butanol and the like or certain halogenated compounds such as carbon tetrachloride, ethylene dichloride, acetylene tetrabromide or the like. The size and shape of the gel particles depend to a certain extent upon the viscosity of the dispersing medium and accordingly mixtures of materials to provide a dispersing medium of the viscosity characteristics necessary are also contemplated. Normally the medium should have a viscosity of between 1 and 20 centipoises.

The size and shape of the gel particles also depend upon the following factors:

a. Degree of agitation during dispersion of sol in dispersing liquid.

b. Amount of emulsifying or surface active agent used to accomplish dispersion.
c. Ratio of dispersing medium to sol.
d. Temperature of emulsion.
e. Composition of sol.

The degree of agitation during dispersion, as indicated in application Ser. No. 577,826 referred to above should be at a propeller peripheral velocity of about 1200 to 1400 ft. per minute.

The amount of emulsifier used varies with the particular agent used as well as the particular dispersing medium and is best determined empirically for the dispersion medium, sol, etc.

The ratio of dispersing medium to sol in the system should be at least one to one and is generally about 5 to 1 although ratios as high as about 10 to 1 can be used.

As indicated above, the composition of the sol should be adjusted to compensate for the dilution caused by the steam condensate. The optimum temperature for setting of the sol can be readily determined empirically and if the determined optimum temperature does not represent a desirable operating temperature, the pH or composition of the sol may be altered or adjusted in order to give the desired setting time and/or temperature.

The following examples will serve to illustrate the manner in which the present invention may be carried out.

The catalyst prepared will conform to the following chemical analysis:

Wt. per cent on bone dry catalyst
| | |
|---|---|
| $SiO_2$ | 79–80 |
| $Al_2O_3$ | 19–21 |
| $SO_4$ | 0.75 max. |
| $Na_2O$ | 0.15 max. |
| $MgO$ | 0.10 max. |
| $Fe_2O_3$ | 0.05 max. |

The following particle size specification will be met:

*Particle size*

| | Per cent |
|---|---|
| 0–20 microns | 3 max. |
| 20–200 microns | 90 min. |
| 100+ microns | 7 max. |
| –149 microns | 99 min. |

36 G. P. M. of a 25° Bé. sodium silicate solution are passed through line 12 cooled to about 100° F. in heat exchanger 14 and mixed with 15 G. P. M. of a 26° Bé. sulfuric acid solution in mixing nozzle 15 and the resultant hydrosol is discharged into mixing tank 17. About 19 G. P. M. of a 34.5° Bé. aluminum sulfate solution are passed through line 11 and intimately mixed with the silica hydrosol in mixing tank 16 to form "impregnated" hydrosol.

An acid treated lubricating oil stock from a coastal crude oil containing from 0.06 to 0.6 cc. "Alkaterge-O" per gallon is pumped into a reactor at a temperature of about 160° F. "Alkaterge-O" is a surface active agent sold by Commercial Solvents E. P. and is believed to be a substituted oxazoline in the form of an oil-soluble dark brown viscous liquid. When a reactor is about 80% filled with oil, oil supply is discontinued, and vigorous agitation is then imparted to the oil. Impregnated hydrosol is then supplied to the sol inlet line 35 at the rate of about 69 gals. per minute while steam at 100 p. s. i. g. is supplied to the inlet line 35 through line 37 in sufficient amount to raise the temperature of the hydrosol to about 161° F. At this temperature the set time of the impregnated hydrosol is about 18 minutes and accordingly agitation of the charged reactor for 18 minutes will suffice to convert the dispersed hydrosol droplets into spherical hydrogel particles. After setting is complete, ammonia, withdrawn from storage drum thru line 38, vaporized in heat exchanger 39 is introduced into the reactor in an amount sufficient to effect about 85% neutralization of the acid and to precipitate the aluminum sulfate throughout the gel structure as $Al_2O_3.X H_2O$. When this degree of ammoniation has been effected, excess ammonia is vented from the reactor and the reactor contents are dumped into the oil separator tank 46 whereupon the reactor is flushed with water at 200° F. to remove particles of gel that may adhere to the reactor surfaces. The dispersion of oil separates from the water slurry of gel particles and is discharged from the separator tank 46 through overflow 50 and surge tank 51 into the oil storage tank 26. In order to clarify the dispersion oil and maintain its dispersing properties, oil is withdrawn from storage tank 26 at the rate of 8.5 gals. per minute, heated to 220° F. under a pressure of about 10 lbs. per square inch and then flashed down to atmospheric pressure to remove entrained water whereupon the oil is filtered to remove solids whereupon the clarified oil is returned to the storage 26 or is passed directly to the oil feed line 27. The water slurry of gel particles is withdrawn through line 53 and is filtered and washed on filter 54 to a sulfate content of about 0.75%. The washed gel particles are then reslurried in water and then aged in tank 55 in contact with water at about 200° F. for a period of at least 20 hours after which the slurry of gel particles in water is again filtered and washed on filter 57 whereupon the gel is dried. This sequence of filtering and washing prior to aging allows the salts to be easily removed and it substantially decreases the aging time which is absolutely essential for obtaining catalyst having superior catalytic qualities.

The importance of this sequence to catalyst purity and activity can be readily seen from the following comparisons.

In procedure 1, the water slurry of gel removed from the oil-water separator was washed and aged concurrently. Aging was for 48 hours at 200° F. whereupon the washed and aged gel was filtered, dried and subjected to standard cracking tests.

In procedure 2, the water slurry of gel removed from the oil-water separator was aged for 20 hours at 200° F. then washed, filtered and dried. The resultant gel was subjected to the same standard cracking tests.

In procedure 3, the water slurry of gel removed from the oil-water separator, filtered and washed immediately then aged for 20 hours at 200° F., filtered, washed and dried whereupon the gel was subjected to the same standard cracking tests.

The results obtained are summarized in the following table:

*Table I*

| Procedure | 1 | 2 | 3 |
|---|---|---|---|
| $SO_4$, Wt. Percent | 2.3 | 0.8 | 0.5 |
| $Na_2O$, Wt. Percent | 0.51 | 0.22 | 0.08 |
| Heat Stability—Percent D+L (After heating at 1600° F. for three hours) | 31 | 33.5 | 45.6 |
| Steam Stability—Percent D+L (After steaming under 60 p. s. i. g. at 1050° F. for 24 hours) | 22.9 | 24.0 | 31.8 |

Procedure 2 above was repeated except that the aging was for a period of 40 hours. The resultant gel particles contained 2.9% SO₄ and 0.67% of Na₂O.

Procedure 3 above was repeated except that the aging time was varied. The results are summarized in the following table:

*Table II*

| Procedure | 3 | | |
|---|---|---|---|
| Aging Time, Hours | 10 | 20 | 40 |
| $SO_4$ | 0.05 | 0.5 | 0.3 |
| $Na_2O$ | 0.09 | 0.08 | 0.11 |
| Heat Stability | 10.3 | 45.6 | 33.8 |
| Steam Stability | 18.8 | 31.8 | 31.8 |

It may be seen from the foregoing data that the sequence of washing out salts immediately followed by aging rather than by aging during washing or aging and then washing gives a more stable and uniform catalyst.

By employing a cycle timing device and suitable mechanically actuated valves it is possible to have the reactor system operate automatically. A typical cycle of operations for a single reactor would be as follows:

| | Time—minutes |
|---|---|
| 1. Pumping oil | 15 |
| 2. Pumping sol | 15 |
| 3. Agitate for setting | 18 |
| 4. Ammoniate | 10 |
| 5. Release NH₃ pressure | 1 |
| 6. Discharge to oil-water separator | 7 |
| 7. Flush with water | 5 |
| 8. Drain and idle time | 4 |
| Total | 75 |

Using a battery of five reactors as shown it would be possible to so integrate the cycle of each reactor so that pumping of oil and sol would be continuous and at a uniform rate while the flow of ammonia would be periodic. The flow of water would also be continuous and uniform since it would be discharged directly into the oil-water separator 46 through line 62 when not needed for flushing down the reactors.

This application is a division of Serial No. 68,028, filed December 29, 1948 now Patent No. 2,577,631 issued December 4, 1951.

It will be understood that numerous variations are possible without departing from the scope of the following claims.

What is claimed is:

1. Apparatus for the production of microspherical inorganic gel particles which comprises in combination, means for continuously mixing hydrosol forming constituents, a plurality of reactors provided with agitator means, a dispersion medium storage tank, valve controlled conduit means for supplying dispersion medium from the storage tank successively to each of the reactors, valve controlled conduit means for supplying hydrosol successively to each of the reactors, an inlet line for discharging steam directly into the hydrosol inlet line just before each of the reactors during the passage of hydrosol through the inlet line to the reactor, a dispersion liquid-water separator, valve controlled lines connected to the bottom of each of the reactors for discharging the reactor contents into said separator, outlet means for the withdrawal of dispersion liquid from the upper part of said separator and conduit means for recycling the dispersion liquid to the storage tank, outlet means for the withdrawal of a slurry of gel particles in water in the lower portion of said separator, means for separating and washing the gel particles, means for reslurrying and aging the gel particles and means for filtering, washing and drying the gel particles.

2. Apparatus for the production of microspherical inorganic gel particles which comprises in combination, means for continuously mixing hydrosol forming constituents, a plurality of reactors provided with agitator means, an oil storage tank, valve controlled conduit means for supplying oil from the storage tank successively to each of the reactors, conduit means for supplying hydrosol to the several reactors, said conduit means terminating in a complete loop, a flow restriction orifice at the inlet to each side of the loop, a separate feeder line to each reactor connected to said loop, the pressure drop through said restriction orifices being substantially greater than the normal pressure drop through either side of the loop thereby assuring flow to each of the feeder lines simultaneously through both sides of the loop, an inlet line for discharging steam directly into said feeder lines just before each of the reactors during the passage of hydrosol through the inlet line to the reactor, an oil separator, valve controlled lines connected to the bottom of each of the reactors for discharging the reactor contents into said oil separator, outlet means for the withdrawal of oil from the upper part of said separator and conduit means for recycling the oil to the oil storage tank, outlet means for the withdrawal of a slurry of gel particles in water in the lower portion of said oil separator, means for separating and washing the gel particle, means for reslurrying and aging the gel particles and means for filtering, washing and drying the gel particles.

3. Apparatus for the production of microspherical inorganic gel particles which comprises in combination, means for continuously mixing hydrosol forming constituents, a plurality of reactors provided with agitator means, an oil storage tank, valve controlled conduit means for supplying oil from the storage tank successively to each of the reactors, conduit means for supplying hydrosol to the several reactors, said conduit means terminating in a complete loop, a flow restriction orifice at the inlet to each side of the loop, a separate feeder line to each reactor connected to said loop, valve means in each of said feeder lines for controlling the flow of hydrosol to each reactor and bleed lines for the supply of small amounts of oil to said feeder lines on both sides of said valve means to prevent stagnation and setting of hydrosol to hydrogel in said feeder lines, the pressure drop through said restriction orifices being substantially greater than the normal pressure drop through either side of the loop thereby assuring flow to each of the feeder lines simultaneously through both sides of the loop, an inlet line for discharging steam directly into said feeder lines just before each of the reactors during passage of hydrosol through the inlet line to the reactor, an oil separator, valve controlled lines connected to the bottom of each of the reactors for discharging the reactor contents into said oil separator, outlet means for the withdrawal of oil from the upper part of said separator and conduit means for recycling the oil to the oil storage tank, outlet means for the withdrawal of a slurry of gel particles in water in the lower portion of said oil separator, means for separating and washing the gel particles, means for reslurrying and aging the gel particles and means for filtering, washing and drying the gel particles.

4. Apparatus for the production of microspherical inorganic gel particles including in combination a plurality of reactors provided with agitator means, an oil storage tank, valve controlled conduit means for supplying oil from said storage tank selectively to each of said reactors, conduit means for supplying gellable hydrosol to said reactors, said last-mentioned conduit means terminating in a complete loop, a flow restriction orifice at the inlet to each side of the loop, a separate feeder line to each reactor connected to said loop, valve means in each of said feeder lines for controlling the flow of hydrosol to each reactor, bleed lines connected to said oil supplying conduit means for supplying small amounts of oil to said feeder lines on both sides of said valve means to prevent stagnation and setting of hydrosol to hydrogel in said feeder lines, the pressure drop through said restriction orifices being substantially greater than the normal pressure drop through either side of the loop thereby assuring flow to each of the feeder lines simultaneously through both sides of the loop, an inlet line for discharging steam directly into said feeder lines just before each of the reactors during passage of hydrosol through the inlet line to the reactor, an oil separator, valve controlled lines connected to bottom of each of the reactors for discharging the reactor contents into said oil separator, outlet means for the withdrawal of oil from the upper part of said separator and conduit means for recycling the oil to the oil storage tank, outlet means for the withdrawal of a slurry of gel particles in water in the lower portion of said oil separator and means for recovering the gel particles from the slurry.

5. Apparatus for the production of microspherical inorganic gel particles including in combination a plurality of reactors provided with agitator means, an oil storage tank, valve controlled conduit means for supplying oil from said storage tank selectively to each of said reactors, conduit means for supplying gellable hydrosol to said reactors, said last-mentioned conduit means terminating in a complete loop, a flow restriction orifice at the inlet to each side of the loop, a separate feeder line to each reactor connected to said loop, the pressure drop through said restriction orifices being substantially greater than the normal pressure drop through either side of the loop thereby assuring flow to each of the feeder lines simultaneously through both sides of said loop, an oil separator, valve controlled lines connected to the bottom of each of the reactors for discharging the reactor contents into said oil separator, means for withdrawing oil from said oil separator and conduit means for recycling the oil to said oil storage tank, outlet means for the withdrawal of a slurry of gel particles in water in the lower portion of said oil separator and means for recovering the gel particles from the slurry.

6. Apparatus for the production of microspherical inorganic gel particles, including in combination, a plurality of reactors provided with agitator means, a storage tank for a liquid dispersion medium, valve controlled conduit means for supplying dispersion medium from the storage tank selectively to the reactors, valve controlled conduit means for supplying hydrosol selectively to the reactors, an inlet line for discharging steam directly into the hydrosol inlet line just before each of said reactors during the passage of hydrosol through the inlet line to the reactor, a dispersion liquid-water separator, valve controlled lines connected to the bottom of each of the reactors for discharging the reactor contents into said separator, outlet means for the withdrawal of dispersion liquid from the upper part of said separator and conduit means for recycling the dispersion liquid to the storage tank, outlet means for the withdrawal of a slurry of gel particles in water in the lower portion of said separator and means for recovering the gel particles from the slurry.

WALTER A. REX.
KARL J. NELSON.

REFERENCES CITED

The following references are of record in the file of this patent:

UNITED STATES PATENTS

| Number | Name | Date |
|---|---|---|
| 2,412,958 | Bates et al. | Dec. 24, 1946 |
| 2,418,232 | Marisic | Apr. 1, 1947 |
| 2,450,394 | Brown et al. | Sept. 28, 1948 |
| 2,454,941 | Pierce et al. | Nov. 30, 1948 |
| 2,474,911 | Pierce et al. | July 5, 1949 |
| 2,528,767 | Marisic | Nov. 7, 1950 |
| 2,577,631 | Rex et al. | Dec. 4, 1951 |